(12) United States Patent
Hikishima

(10) Patent No.: US 7,190,977 B2
(45) Date of Patent: Mar. 13, 2007

(54) COLLAPSIBLE MOBILE TERMINAL, ITS DISPLAY METHOD AND ITS PROGRAM

(75) Inventor: Naoki Hikishima, Tokyo (JP)

(73) Assignee: NEC Corporation (JP)

( * ) Notice: Subject to any disclaimer, the term of this patent is extended or adjusted under 35 U.S.C. 154(b) by 358 days.

(21) Appl. No.: 10/232,007

(22) Filed: Aug. 29, 2002

(65) Prior Publication Data

US 2003/0045245 A1    Mar. 6, 2003

(30) Foreign Application Priority Data

Aug. 31, 2001 (JP) ............................. 2001-264249

(51) Int. Cl.
*H04B 1/38* (2006.01)

(52) U.S. Cl. .................... 455/566; 455/575.3

(58) Field of Classification Search ............ 455/550.1, 455/575.1, 575.3, 566, 347, 351; 379/433.01, 379/433.04, 433.13
See application file for complete search history.

(56) References Cited

U.S. PATENT DOCUMENTS

| | | | | |
|---|---|---|---|---|
| 6,445,932 B1 * | 9/2002 | Soini et al. | ............... | 455/556.1 |
| 6,653,996 B2 * | 11/2003 | Komiya | ..................... | 345/76 |
| 6,682,427 B2 * | 1/2004 | Wolinsky | ..................... | 463/41 |
| 6,761,638 B1 * | 7/2004 | Narita | ..................... | 463/43 |
| 2002/0022503 A1 * | 2/2002 | Lee | ............................. | 455/566 |

FOREIGN PATENT DOCUMENTS

| | | |
|---|---|---|
| EP | 1156640 | 11/2001 |
| EP | 1244275 | 9/2002 |
| GB | 2001462 A * | 1/1979 |
| GB | 2343324 | 6/2000 |
| GB | 2358318 | 7/2001 |
| JP | 3074944 | 6/2000 |
| JP | 2001-136247 | 5/2001 |
| JP | 2001-136248 | 5/2001 |
| JP | 2001-136250 | 5/2001 |
| JP | 2001-136251 | 5/2001 |

OTHER PUBLICATIONS

Combined Search and Examination Report issued by United Kingdom Patent Office on Feb. 13, 2003 and accompanying cover letter.

* cited by examiner

*Primary Examiner*—Nguyen T. Vo
(74) *Attorney, Agent, or Firm*—Ostrolenk, Faber, Gerb & Soffen, LLP

(57) ABSTRACT

In a collapsible mobile terminal provided with display device installed on the outside face of the collapsible body and display device installed on the inside face of the body, opening/closing detection device for detecting an open or closed state of the body is provided, information is displayed on the display device on the inside face in case the body is unfolded based upon the result of detection by the opening/closing detection device and information is displayed on the display device on the outside face in case the body is folded. The unused display device is powered off.

83 Claims, 5 Drawing Sheets

COLLAPSIBLE MOBILE TERMINAL, ITS DISPLAY METHOD AND ITS PROGRAM

BACKGROUND OF THE INVENTION

1. Field of the Invention

The present invention relates to a collapsible mobile terminal having display means on the outside face of the body and display means on the inside face of the body, its display method and its program, particularly relates to a collapsible mobile terminal that reduces the power consumption of them, its display method and its program.

2. Related Art of the Invention

A conventional type collapsible mobile telephone is provided with display means only on a face (hereinafter called the inside face) on which each part of the body when the body is folded is touched and the display means is protected by not exposing the display means to the outside when the body is folded. In the meantime, recently, a collapsible mobile telephone wherein display means that displays the remaining amount of a battery, time and field intensity for display when receiving is awaited is added to a normally exposed face (hereinafter called the outside face) of the body has been provided. An operator can confirm various status of his/her mobile telephone from the outside without opening the body.

For prior art related to a collapsible mobile telephone provided with display means on the inside face and on the outside face of the body, the following can be given.

Japanese published patent application No. 3074944 (applied on Jul. 20, 1992) discloses technique for switching a display screen depending upon a state in which the body of a collapsible mobile telephone is folded and a state in which the body is unfolded.

In Japanese published unexamined patent application No. 2001-136247 (applied on Nov. 5, 1999), technique for controlling display contents displayed on display means on the outside face and on display means on the inside face depending upon a folded/unfolded state of the body is disclosed.

In Japanese published unexamined patent application No. 2001-136248 (applied on Nov. 5, 1999), technique for providing display means that also displays non-voice information in a folded state and minimum operation means on the outside face of a collapsible mobile telephone is disclosed.

In Japanese published unexamined patent application No. 2001-136250 (applied on Nov. 5, 1999), technique for enabling playing a game utilizing display means on the outside face of a collapsible mobile telephone is disclosed.

In Japanese published unexamined patent application No. 2001-136251 (applied on Nov. 5, 1999), technique for also enabling conversation and a call in a state in which a collapsible mobile telephone is folded is disclosed.

As the mobile telephones related to the prior art described above are provided with two display means, two buses for display are required. Therefore, for terminals of IC that outputs a display signal, the double number is required, compared with the number of terminals of the conventional type provided with one display means. The two display means are required to be controlled and operations are complex. In this respect, the prior art suggests no measure.

SUMMARY OF THE INVENTION

The invention is made in view of the problems and the object is to provide a collapsible mobile terminal which is based upon a collapsible mobile terminal provided with display means on the outside face and on the inside face and in which display means on the inside face and display means on the outside face are connected via a display bus of one system and display contents can be automatically switched when it is detected that the body is folded or unfolded, its display method and its program.

Another object is to provide a collapsible mobile terminal in which a power source for each display means is also switched according to a folded/unfolded state of the body and display control the operability of which is satisfactory and the power consumption of which is small is enabled, its display method and its program.

To achieve the two objects, the following configuration is adopted.

That is, a collapsible mobile terminal according to the invention is based upon a collapsible mobile terminal provided with display means on the outside face installed on the outside face of the collapsible body and display means on the inside face installed on the inside face of the body and is characterized in that opening/closing detection means for detecting a folded/unfolded state of the body and control means for controlling display means on the outside face and display means on the inside face based upon the result of detection by the opening/closing detection means are provided, a display bus connecting the control means and first display means and a display bus connecting the control means and second display means are common and the control means controls display means on the inside face and display means on the outside face according to a folded/unfolded state of the body detected by the opening/closing detection means.

A suitable embodiment is characterized in that when it is detected by the opening/closing detection means that the body is unfolded in case the body is folded and display means on the outside face displays information, the data of the current display image on the display means on the outside face is stored in a memory, the display means on the outside face is turned off and display means on the inside face is turned on or when it is detected by the opening/closing detection means that the body is folded in case the body is unfolded and display means on the inside face displays information, display on display means on the inside face is automatically halted, the data of a display image is stored in a memory, the display means on the inside face is turned off and display means on the outside face is turned on.

DETAILED DESCRIPTION OF THE PREFERRED EMBODIMENT

Referring to the attached drawings, a collapsible mobile telephone equivalent to an embodiment of the invention, its display method and its program will be described in detail below.

Figure 1C:
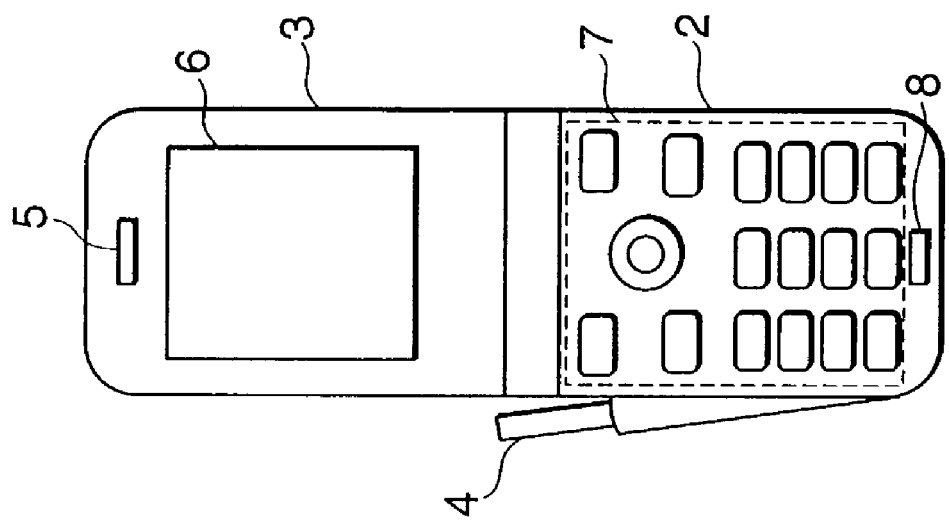
FIG. 1C is a front view showing display means on the inside face of the collapsible mobile telephone equivalent to the embodiment of the invention when it is unfolded.
Figure 1B:
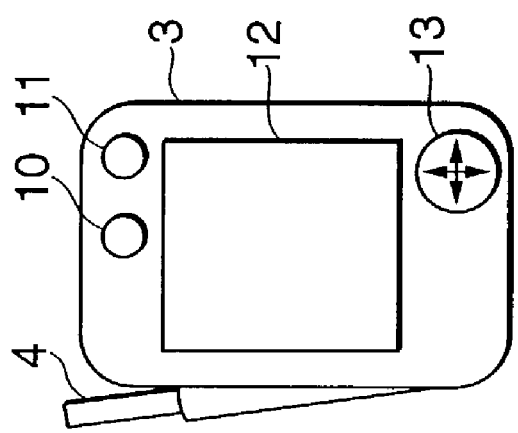
FIG. 1B is a front view showing display means on the outside face of the collapsible mobile telephone equivalent to the embodiment of the invention when it is folded.
Figure 1A:
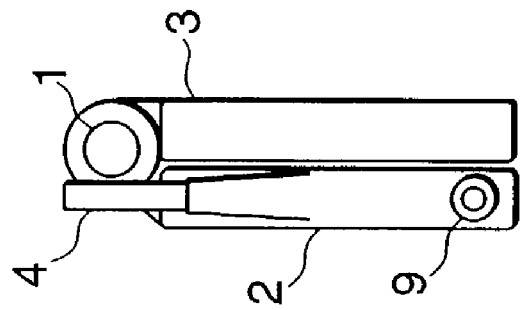
FIG. 1A is a side view showing a collapsible mobile telephone equivalent to an embodiment of the invention when it is folded.

FIG. 1A shows the collapsible mobile telephone in a folded state viewed from the side and FIG. 1B shows the collapsible mobile telephone in the folded state viewed from the front. FIG. 1C shows the collapsible mobile telephone in an unfolded state viewed from the front. Referring to these drawings, the collapsible mobile telephone equivalent to the embodiment of the invention will be described below.

As shown in FIG. 1A, a first body 3 and a second body 2 are coupled via a hinge 1 and have collapsible structure. An antenna 4 that can be pulled out diagonally upward is provided on the side of the second body 2. A magnet (not shown) is built in the first body 3. A reed switch (not shown) is built in the second body 2. When the bodies are closed and the magnet and the reed switch approach, the reed switch is turned on and when the bodies are opened and the magnet and the reed switch separate, the reed switch is turned off. It is detected based upon this structure whether the bodies are opened or closed. A jack for an earphone-microphone 9 is provided below the side on which the antenna 4 is installed. In place of the reed switch, Hall element and a physical switch may be also used.

As shown in FIG. 1B, first display 12 formed by a liquid crystal display and others is provided to the outside face of the first body 3. In the vicinity of the first display 12, a conversation initiation button 10, a call termination button 11 and a so-called navigation key 13 for selecting and determining by scrolling in four directions of the upside, the downside, the right and the left and pressing the center are provided. These are used when a game is played on the first display 12. In this embodiment, when a call is made while a game for a mobile telephone is played, the navigation key 13 functions as a game initiation button and the game can be resumed in a state in which the call is ignored by pressing it long by fixed time when the call is made.

As shown in FIG. 1C, second display 6 is provided to the inside face of the first body 3. When the body 3 is opened upward, a character and image information are displayed on the second display 6 on the inside Lace of the first body 3. A key operation console 7, and a microphone 8 is provided on the inside face of the second body 2 and a speaker 5 is provided to the inside face of the first body 3.

Figure 2:
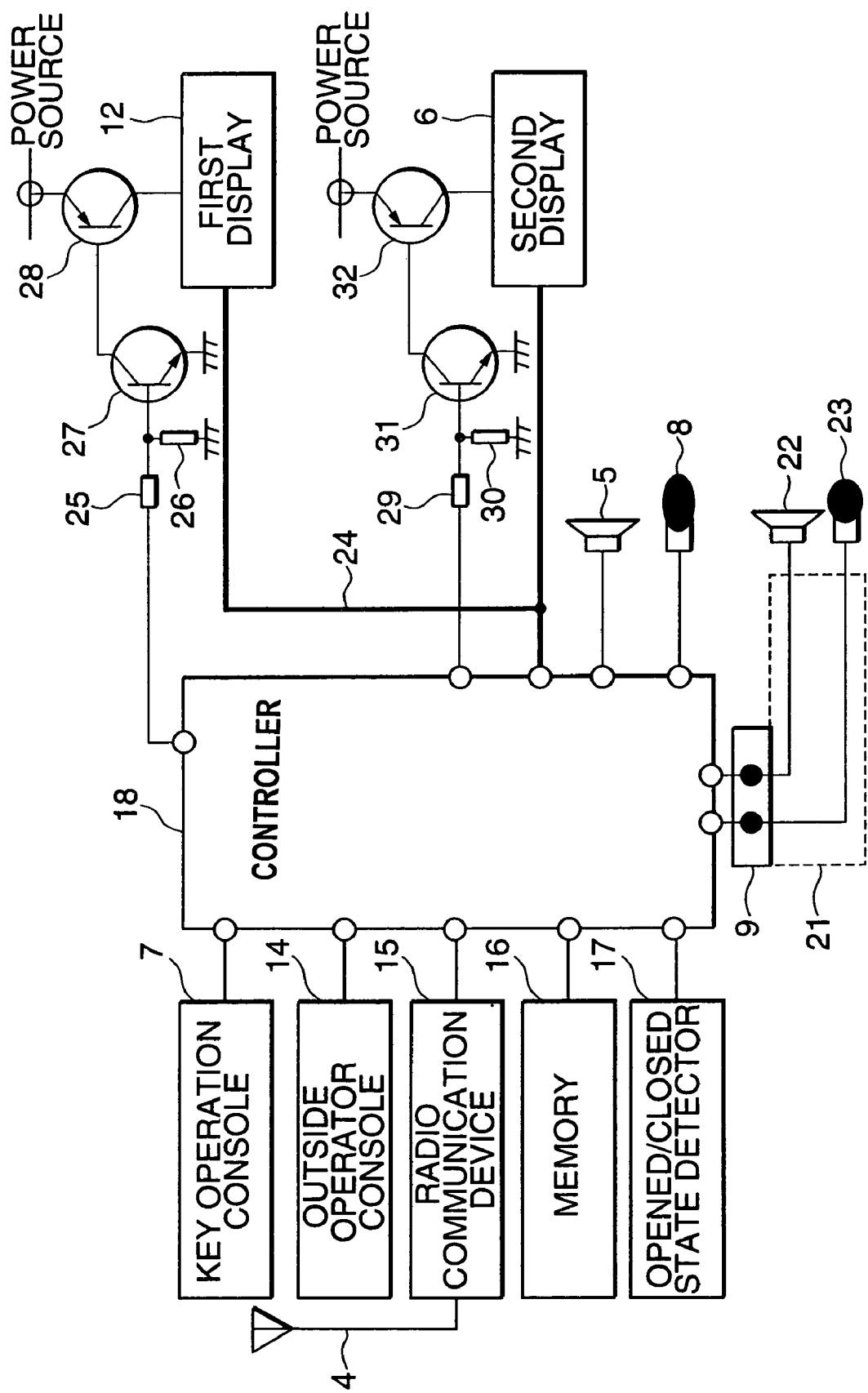
FIG. 2 is a block diagram showing the internal configuration of the mobile telephone equivalent to the embodiment of the invention.

FIG. 2 is a block diagram showing the internal configuration of the mobile telephone equivalent to the embodiment of the invention. As shown in FIG. 2, an electric wave received via the antenna 4 is input to a receiver (not shown) of a radio communication device 15.

The second display 6 is display means provided to the inside face of the body. The second display 6 is protected from the damage of the display means because it is stored on a contact surface between the first body 3 and the second body 2 and is not exposed to the outside when the mobile telephone is folded.

The microphone 8 receives the voice of a user and transmits it to a controller 18.

The radio communication device 15 transmits received information acquired by demodulating the electric wave to the controller 18.

The controller 18 displays received information including a received telephone number and others on the first display 12 provided to the outside face of the body or the second display 6. The controller 18 also converts the received information to voice information and outputs it to the speaker 5 in the form of voice. Further, the controller 18 transmits the voice information transmitted from the microphone 8 to the other party via a transmitter (not shown) of the radio communication device 15 and the antenna 4 by radio. In the key operation console 7, a signal is input to the controller 18 by key operation and telephone number information and others are stored in a memory 16 via the controller 18. In this embodiment, to initiate conversation in call incoming, the key operation console 7 is required to be operated. A conversation initiation button (not shown) is under the control of the controller 18 and to initiate conversation, the conversation initiation button is pressed.

An/a opened/closed state detector 17 in the body detects an/a opened/closed state of the bodies and transmits to the controller 18.

The first display 12 is display means located on the outside face of the body 3. In this embodiment, when a downloaded game (hereinafter called a mobile game) is executed, the first display 12 is used.

An outside operator console 14 is an operator console located on the outside face of the first body 3 composed of the conversation initiation button 10, the call termination button 11 and the navigation button 13 for enabling simple operation in a state in which the body is folded, for example, switching display on display means. In case the outside operator console 14 can be used as the control means of a mobile game, it makes the first display 12 display the result of the operation.

An earphone-microphone 21 is provided with an earphone 22 and a microphone 23 at the end. When an operator inserts the earphone-microphone 21 into the jack for the earphone-microphone 9, the controller 18 and the earphone-microphone 21 are connected. Hereby, even if the body is folded, the operator can hear voice in a mobile game and can make conversation via a telephone.

A display bus 24 is composed of a data bus and an address bus for transmitting/receiving data for display from the controller to the first display 12 and the second display 6.

The emitter and the collector of a transistor 28 are connected to the first display 12 and a power source. The base of the transistor 28 is grounded via the collector and the emitter of another transistor 27. The base of the transistor 27 is connected to a resistor 25 and a resistor 26 and is connected to an output terminal of the controller 18 via the resistor 25.

The emitter and the collector of a transistor 32 are connected to the second display 6 and a power source. As in the case of the first display 12, the base of the transistor 32 is connected to an output terminal of the controller 18 via a transistor 31, a resistor 29 and a resistor 30.

Figure 3:
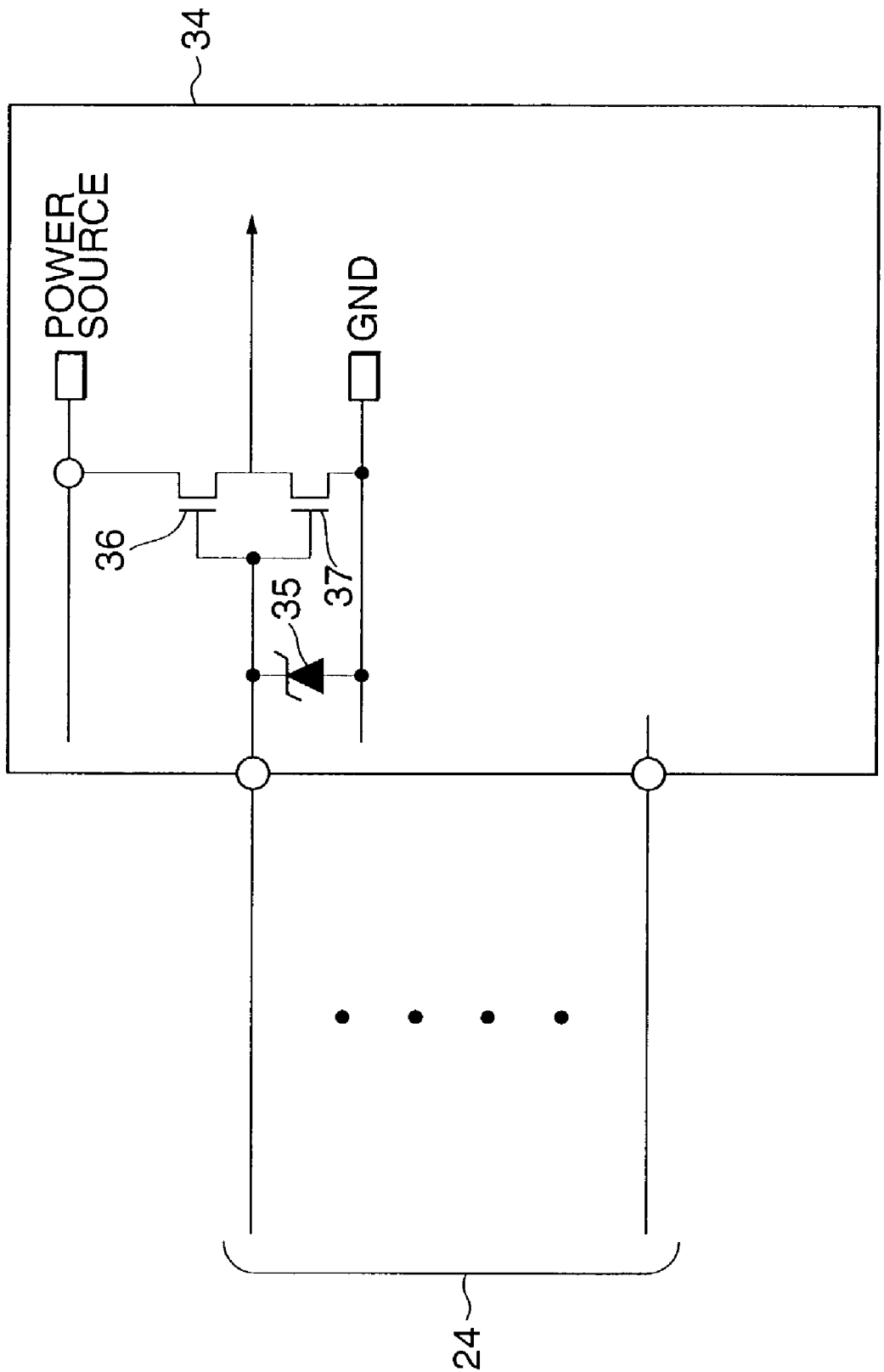
FIG. 3 is a circuit diagram showing an input device to first display means and second display means in the embodiment of the invention.

FIG. 3 is a circuit diagram showing an input device 34 to the first display 12 and the second display 6 in the embodiment of the invention. Though supply voltage lowers when the operator powers off, the impedance of the input device connected to the controller 18 via the display bus 24 is kept high and current from the controller 18 and another display means never flows into the power source. Zener diode 35 is operated at supply voltage or more voltage. Transistors 36 and 37 form an inverter.

Figure 4:
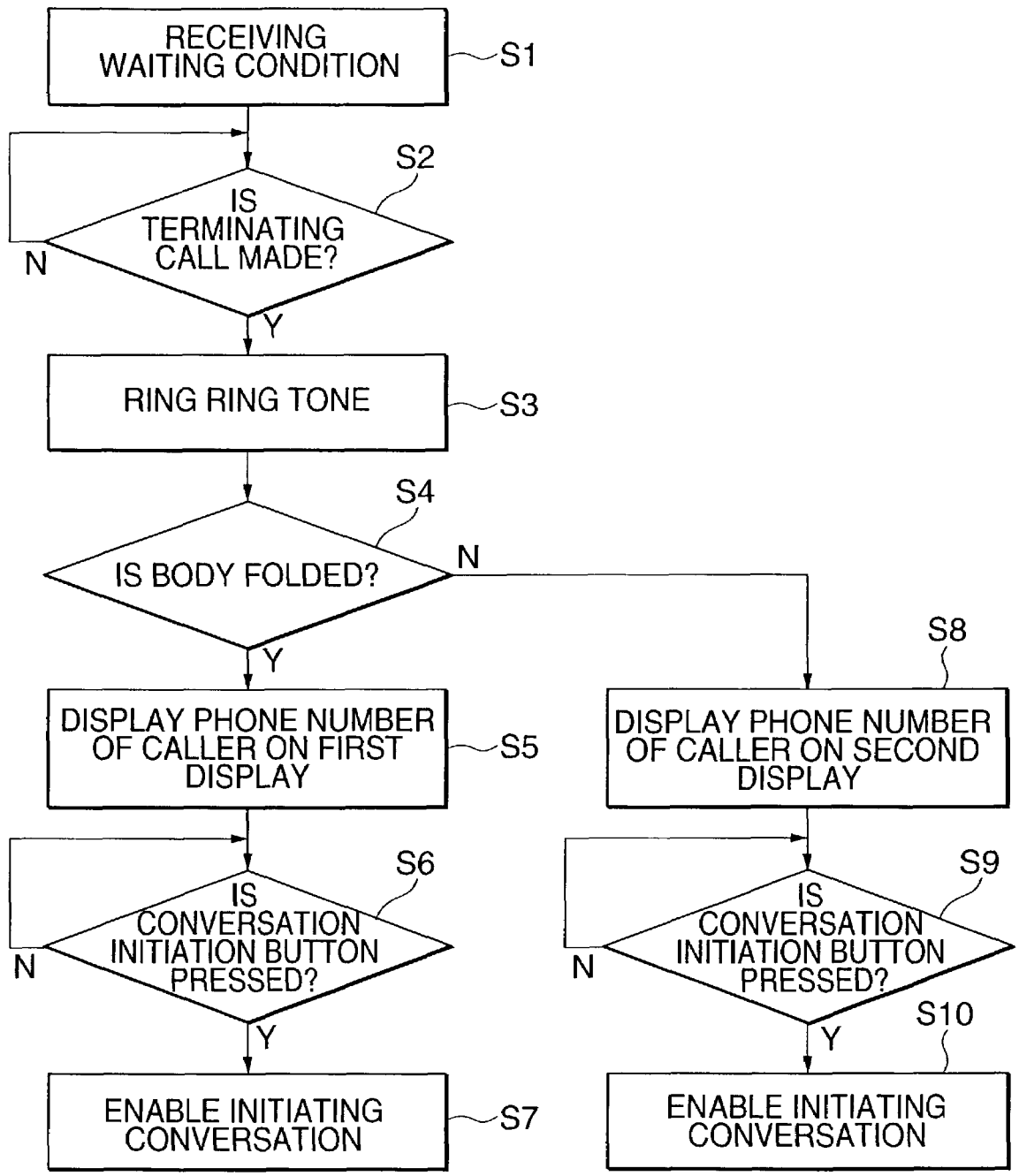
FIG. 4 is a flowchart showing operation in which the collapsible mobile telephone equivalent to the embodiment of the invention starts to communicate from a receiving waiting condition independent of a folded/unfolded state of the body.
Figure 5:
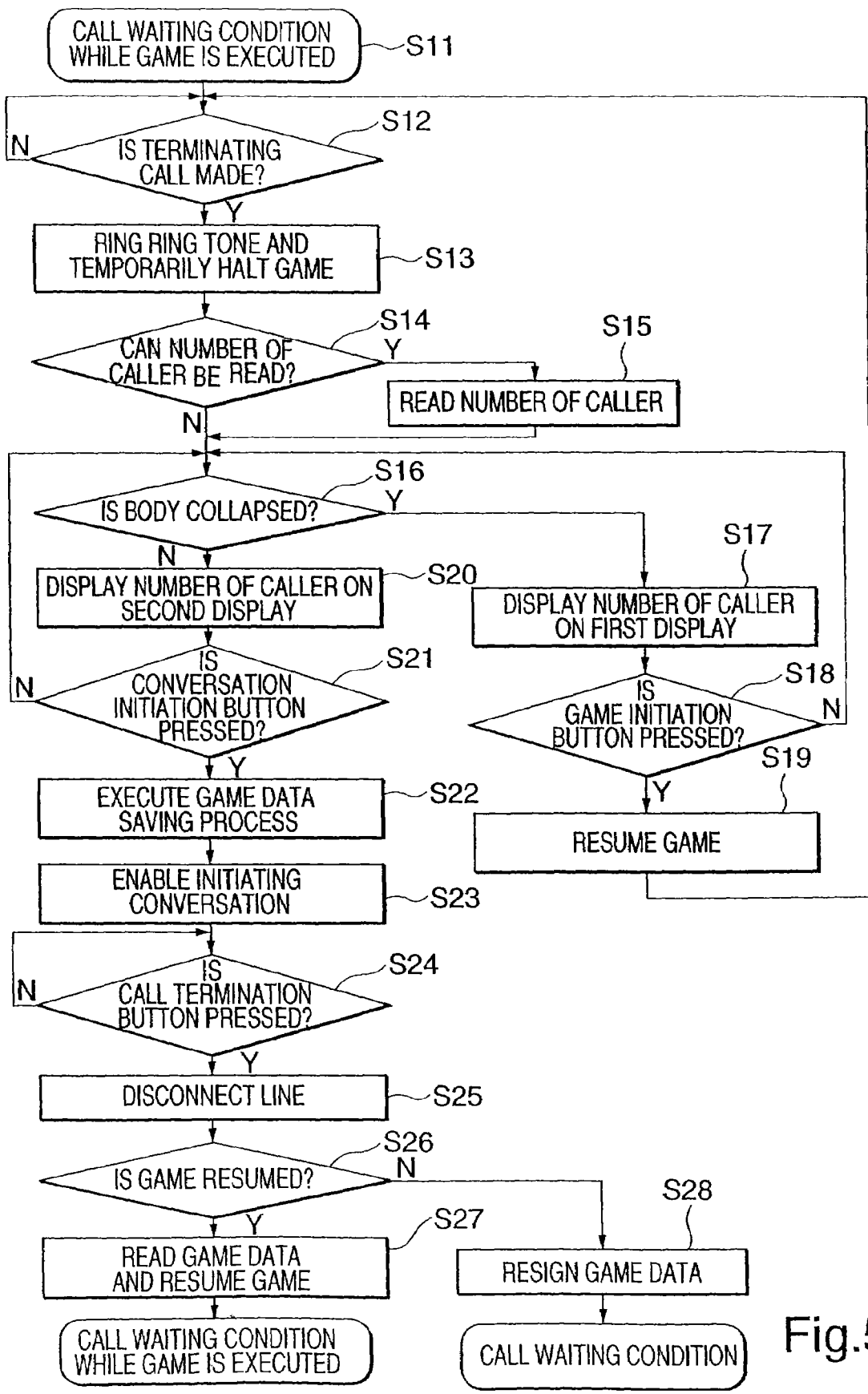
FIG. 5 is a flowchart showing operation in case the collapsible mobile telephone equivalent to the embodiment of the invention is used for game equipment.

Referring to FIGS. 4 and 5, the operation of the embodiment of the invention will be described below.

FIG. 4 is a flowchart showing operation (a display method) for initiating a call from a receiving waiting condition independent of a folded/unfolded state of the body of the collapsible mobile telephone equivalent to the embodiment of the invention. When a terminating call is made (a step S2/Yes) while the collapsible mobile telephone is powered on and is in a receiving waiting condition (a step S1), a ring tone is ringed (a step S3).

The controller 18 acquires opened/closed state detection information from the cover opened/closed state detector 17 and judges whether the body is folded or not (a step S4). In case the body is folded (the step S4/Yes), the controller 18 displays caller information such as a telephone number and a name of a caller on the first display 12 on the outside face of the body (a step S5).

At this time, a power source for the second display 6 inside the body is automatically turned off based upon closed state detection information. The first display 12 and the second display 6 are connected via the common display bus 24 as shown in FIG. 2. As the input circuit to these display means is configured as shown in FIG. 3 and the impedance of the input device 34 remains high even if the unused display means is powered off and the power consumption is saved, no current flows to another display means from the controller 18 and one display means via the display bus 24.

When the conversation initiation button 10 is pressed by the user (a step S6/Yes), conversation is initiated using the earphone-microphone 21 connected to the jack for the earphone-microphone 9 (a step S7).

When the body is unfolded (the step S4/No) in the step S4, the controller 18 displays caller information on the second display 6 on the inside face of the body (a step S8).

At this time, contrary to the case that the body is folded, the first display 12 on the outside face of the body is automatically powered off based upon closed state detection information. When the conversation initiation button (not shown) in the key operation console 7 is pressed (a step S9/Yes), conversation is initiated using the speaker 5 located on the inside face of the first body 3 and the microphone 8 located on the inside face of the second body 2 (a step S10).

As described above, according to the invention, independent of an/a opened/closed state of the body, when a terminating call is made, conversation can be made and as the unused display means is automatically powered off based upon opened/closed state detection information, the power consumption can be easily saved.

FIG. 5 is a flowchart showing operation (a display method) in case the collapsible mobile telephone equivalent to the embodiment of the invention is used for game equipment.

When a terminating call is made (a step S12) while the user executes a game, the controller 18 temporarily halts the game (a step S13). Afterward, the controller 18 checks whether the number of a caller can be read based upon a calling signal or not (a step S14) and in case the number of the caller can be read, the controller stores it in the memory 16 for a read caller number (a step S15). In case the number of the caller cannot be read, a default character string, for example information such as no information of a caller may be also stored in the memory in place of the number of the caller.

The controller 18 acquires opened/closed state detection information from the cover opened/closed state detector 17 and judges whether the body is folded or not (a step S16). At this time, in case the body is folded (the step S16/Yes), the controller displays the number of the caller stored in the step S15 on the first display 12 (a step S17) and afterward, when the game initiation button is pressed, the controller does not respond to calling and resumes the game (a step S19) Conversely in case the body is unfolded (the step S16/No), the controller sends the number of the caller as display data via the display bus 24 and makes the second display 6 display the number (a step S20).

When the conversation initiation button is pressed (a step S21/Yes), the controller 18 once saves the data of the game in the memory 16 (a step S22), connects a line to initiate conversation (a step S23) and until the line is turned off, the conversation is continued.

When the operator presses the call termination button (a step S24/Yes), the controller 18 turns off the line (a step S25) and makes the second display 6 display a message requesting so that it is selected whether the resumption of the game is desired or not (a step S26). In case the operator does not desire the resumption of the game (the step S26/No), the data saved in the memory 16 is resigned (a step S28) and control is returned to a waiting condition. In the meantime, in case the resumption of the game is desired (the step S26/Yes), the resumption of the game is prepared based upon the data saved in the memory 16 (a step S27) and when the body is folded, the game can be resumed. For the resumption of the game, when the navigation button is pressed long and the body is folded, the game can be resumed, however, in this embodiment, concrete realizing means is not particularly limited.

As shown in FIG. 2, in case the first display 12 is used for a game and others and the second display 6 is not used, voltage at a high level is output from the controller 18 via the resistor 25. The transistor 27 is turned on, the transistor 28 is turned on and power is supplied to the first display 12. In the meantime, voltage at a low level is output from the controller 18 via the resistor 29. The transistor 31 is turned off, the transistor 32 is turned off and no power is supplied to the second display 6.

The display method according to the invention can be realized by executing a program. The program is provided in a state in which it is recorded on an optical record medium, a magnetic record medium, a photomagnetic record medium or a semiconductor IC record medium. The program can be also provided by being downloaded in equipment via a network according to a file transfer protocol (FTP).

In the embodiment described above, an example of the suitable embodiment of the invention is shown and the invention is not limited to it. In a range that does not deviate from the objects, various transformed embodiment is allowed. For example, in the description, the mobile telephone is given for an example. The invention can be applied to equipment having two display means in the collapsible body and can be also applied to PHS, PDA and notebook-sized PC in addition to the mobile telephone.

The case that the collapsible mobile telephone is used for game equipment is described above. The invention can be also similarly applied to a case of another application and for example, the invention can be also applied to a case that a name of a piece of music and others are displayed on display means on the outside face in a mobile telephone in which a music reproduction function is built and a case that an unsealed electronic mail is displayed on the display means on the outside face.

As clear from the description, according to the invention, in the case of the collapsible mobile telephone provided with the display means on the outside face and the display means on the inside face, as another display means is not required to be displayed when one display means is seen, display on the two display means is enabled by one input by connecting a video data input line in common and sending display data respectively required in the state in which the body is folded and in the state in which it is unfolded. There is effect that for the terminal of IC for outputting a display signal, only a half of the conventional type is required.

Also, according to the invention, as display on the outside face is not required when the body is unfolded and conversation is made, there is the effect of providing the contents of display from being seen by a person near to the mobile telephone and reducing power consumption by automatically turning off display on the outside face based upon the detection of an/a opened/closed state.

What is claimed is:

1. A collapsible mobile terminal comprising:
   a first display means on the outside face of the collapsible body;
   a second display means on the inside face of the body;
   an opening/closing detection means for detecting an opened or closed state of the body;
   a single controller at least controlling the display means on the outside face and the display means on the inside face based upon the result of detection by the opening/closing detection means and
   a common display bus connecting the single controller and the display means on the outside face and the display means on the inside face,
   the single controller controlling at least one function of said collapsible mobile terminal and at least one application resident on said collapsible mobile terminal,
   execution of the at least one application being interrupted by activation of the at least one function at least after the opening/closing detection means detects the opened or closed state of the body.

2. A collapsible mobile terminal according to claim 1, wherein:
   an input means to which the display means on the outside face and the display means on the inside face are connected in common is at high impedance even if the input means is powered off.

3. A collapsible mobile terminal according to claim 2, wherein:
   when the opening/closing detection means detects that the body is being unfolded and the display means on the outside face displays information, the single controller halts processing on the display means on the outside face temporarily, stores the information on the display means on the outside face and data related to it in a memory, powers the display means on the outside face off and powers the display means on the inside face on.

4. A collapsible mobile terminal according to claim 3, wherein:
   in case the body is unfolded and then folded, the single controller resumes processing before a call using the information on the display means on the outside face and the related data which are respectively stored in the memory.

5. A collapsible mobile terminal according to claim 4, wherein:
   when it is detected by the opening/closing detection means that the body is being folded and the display means on the inside face displays information, the single controller halts display on the inside face temporarily, stores the information on the display means on the inside face in a memory, powers off the display means on the inside face and powers on the display means on the outside face.

6. A collapsible mobile terminal according to claim 4, wherein:
   the single controller powers off the display means on the inside face when the body is in a closed state.

7. A collapsible mobile terminal according to claim 4, wherein:
   the single controller powers off the display means on the outside face when the body is in an opened state.

8. A collapsible mobile terminal according to claim 3, wherein:
   when it is detected by the opening/closing detection means that the body is being folded and the display means on the inside face displays information, the single controller halts display on the inside face temporarily, stores the information on the display means on the inside face in a memory, powers off the display means on the inside face and powers on the display means on the outside face.

9. A collapsible mobile terminal according to claim 3, wherein:
   the single controller powers off the display means on the inside face when the body is in a closed state.

10. A collapsible mobile terminal according to claim 3, wherein:
    the single controller powers off the display means on the outside face when the body is in an opened state.

11. A collapsible mobile terminal according to claim 2, wherein:
    when it is detected by the opening/closing detection means that the body is being folded and the display means on the inside face displays information, the single controller halts display on the display means on the inside face temporarily, stores the information on the display means on the inside face in a memory, powers off the display means on the inside face and powers on the display means on the outside face.

12. A collapsible mobile terminal according to claim 11, wherein:
    the single controller powers off the display means on the inside face when the body is in a closed state.

13. A collapsible mobile terminal according to claim 11, wherein:
    the single controller powers off the display means on the outside face when the body is in an opened state.

14. A collapsible mobile terminal according to claim 2, wherein:
    the single controller powers off the display means on the inside face when the body is in a closed state.

15. A collapsible mobile terminal according to claim 14, wherein:
    the single controller powers off the display means on the outside face when the body is in an opened state.

16. A collapsible mobile terminal according to claim 2, wherein:
    the single controller powers off the display means on the outside face when the body is in an opened state.

17. A collapsible mobile terminal according to claim 1, wherein:
    when the opening/closing detection means detects that the body is being unfolded and the display means on the outside face displays information, the single controller halts processing for the display means on the outside face temporarily, stores the information on the display means on the outside face and data related to it in a memory, powers the display means on the outside face off and powers the display means on the inside face on.

18. A collapsible mobile terminal according to claim 17, wherein:
in case the body is unfolded and then folded, the single controller resumes processing before a call using the information on the display means on the outside face and the related data respectively stored in the memory.

19. A collapsible mobile terminal according to claim 18, wherein:
when it is detected by the opening/closing detection means that the body is being folded and the display means on the inside face displays information, the single controller halts display on the display means on the inside face temporarily, stores the information on the display means on the inside face in a memory, powers off the display means on the inside face and powers on the display means on the outside face.

20. A collapsible mobile terminal according to claim 19, wherein:
the single controller powers off the display means on the inside face when the body is in a closed state.

21. A collapsible mobile terminal according to claim 19, wherein:
the single controller powers off the display means on the outside face when the body is in an opened state.

22. A collapsible mobile terminal according to claim 18, wherein:
the single controller powers off the display means on the inside face when the body is in a closed state.

23. A collapsible mobile terminal according to claim 22, wherein:
the single controller powers off the display means on the outside face when the body is in an opened state.

24. A collapsible mobile terminal according to claim 18, wherein:
the single controller powers off the display means on the outside face when the body is in an opened state.

25. A collapsible mobile terminal according to claim 17, wherein:
when it is detected by the opening/closing detection means that the body is being folded and the display means on the inside face displays information, the single controller halts display on the display means on the inside face temporarily, stores the information on the display means on the inside face in a memory, powers off the display means on the inside face and powers on the display means on the outside face.

26. A collapsible mobile terminal according to claim 25, wherein:
the single controller powers off the display means on the inside face when the body is in a closed state.

27. A collapsible mobile terminal according to claim 25, wherein:
the single controller powers off the display means on the outside face when the body is in an opened state.

28. A collapsible mobile terminal according to claim 17, wherein:
the single controller powers off the display means on the inside face when the body is in a closed state.

29. A collapsible mobile terminal according to claim 28, wherein:
the single controller powers off the display means on the outside face when the body is in an opened state.

30. A collapsible mobile terminal according to claim 17, wherein:
the single controller powers off the display means on the outside face when the body is in an opened state.

31. A collapsible mobile terminal according to claim 1, wherein:
when it is detected by the opening/closing detection means that the body is being folded and the display means on the inside face displays information, the single controller halts display on the display means on the inside face temporarily, stores the information on the display means on the inside face in a memory, powers off the display means on the inside face and powers on the display means on the outside face.

32. A collapsible mobile terminal according to claim 31, wherein:
the single controller powers off the display means on the inside face when the body is in a closed state.

33. A collapsible mobile terminal according to claim 32, wherein:
the single controller powers off the display means on the outside face when the body is in an opened state.

34. A collapsible mobile terminal according to claim 31, wherein:
the single controller powers off the display means on the outside face when the body is in an opened state.

35. A collapsible mobile terminal according to claim 1, wherein:
the single controller powers off the display means on the inside face when the terminal is in a closed state.

36. A collapsible mobile terminal according to claim 35, wherein:
the single controller powers off the display means on the outside face when the body is in an opened state.

37. A collapsible mobile terminal according to claim 1, wherein:
the single controller powers off the display means on the outside face when the terminal is in an opened state.

38. A collapsible mobile terminal comprising:
a display circuit on the outside face of the collapsible body;
a display circuit on the inside face of the body;
an opening/closing detection circuit for detecting an open or closed state of the body;
a single control circuit for at least controlling the display circuit on the outside face and the display circuit on the inside face based upon the result of detection by the opening/closing detection circuit; and
a common display bus connecting the single control circuit and the display circuits,
the single control circuit controlling at least one function of said collapsible mobile terminal and at least one application resident on said collapsible mobile terminal,
execution of the at least one application being interrupted by activation of the at least one function at least after the opening/closing detection circuit detects the open or closed state of the body.

39. A collapsible mobile terminal according to claim 38, wherein:
an input circuit to which the display circuit on the outside face and the display circuit on the inside face are connected in common is at high impedance even if the input circuit is powered off.

40. A collapsible mobile terminal according to claim 39, wherein:

when it is detected by the opening/closing detection circuit that the body is unfolded and the display circuit on the outside face displays information, the single control circuit halts the display on the outside face temporarily, stores the information on the display circuit on the outside face and data related to it in a memory, powers the display circuit on the outside face off and powers the display circuit on the inside face on.

41. A collapsible mobile terminal according to claim 40, wherein:
in case the body is unfolded and then folded, the single control circuit resumes processing before a conversation using the information on the display circuit on the outside face and the related data respectively stored in the memory.

42. A collapsible mobile terminal according to claim 41, wherein:
when it is detected by the opening/closing detection circuit that the body is being folded and the display circuit on the inside face displays information, the single control circuit halts display on the inside face by the display circuit temporarily, stores the information on the inside face in a memory, powers off the display on the inside face and powers on the display on the outside face.

43. A collapsible mobile terminal according to claim 41, wherein:
the single control circuit powers off the display circuit on the inside face when the body is in a closed state.

44. A collapsible mobile terminal according to claim 40, wherein:
when it is detected by the opening/closing detection circuit that the body is being folded and the display circuit on the inside face displays information, the single control circuit halts display on the inside face by the display circuit temporarily, stores the information on the inside face in a memory, powers off the display on the inside face and powers on the display on the outside face.

45. A collapsible mobile terminal according to claim 40, wherein:
the single control circuit powers off the display circuit on the inside face when the body is in a closed state.

46. A collapsible mobile terminal according to claim 39, wherein: p1 when it is detected by the opening/closing detection circuit that the body is being folded and the display circuit on the inside face displays information, the single control circuit halts display on the inside face by the display circuit temporarily, stores the information on the inside face in a memory, powers off the display on the inside face and powers on the display on the outside face.

47. A collapsible mobile terminal according to claim 46, wherein:
the single control circuit powers off the display circuit on the inside face when the body is in a closed state.

48. A collapsible mobile terminal according to claim 39, wherein:
the single control circuit powers off the display circuit on the inside face when the body is in a closed state.

49. A collapsible mobile terminal according to claim 39, wherein:
the single control circuit powers off the display circuit on the outside face when the body is in an opened state.

50. A collapsible mobile terminal according to claim 38, wherein:
when it is detected by the opening/closing detection circuit that the body is being unfolded and the display circuit on the outside face displays information, the single control circuit halts the display of the information on the outside face temporarily, stores the information on the display circuit on the outside face and data related to it in a memory, powers the display circuit on the outside face off and powers the display circuit on the inside face on.

51. A collapsible mobile terminal according to claim 50, wherein:
in case the body is unfolded and then folded, the single control circuit resumes processing before a conversation using the information on the display circuit on the outside face and the related data which are respectively stored in the memory.

52. A collapsible mobile terminal according to claim 51, wherein:
when it is detected by the opening/closing detection circuit that the body is being folded and the display circuit on the side face displays information, the single control circuit halts display on the inside face by the display circuit temporarily, stores the information on the inside face in a memory, powers off the display on the inside face and powers on the display on the outside face.

53. A collapsible mobile terminal according to claim 51, wherein:
the single control circuit powers off the display circuit on the inside face when the body is in a closed state.

54. A collapsible mobile terminal according to claim 51, wherein:
the single control circuit powers off the display circuit on the outside face when the body is in an opened state.

55. A collapsible mobile terminal according to claim 50, wherein:
when it is detected by the opening/closing detection circuit that the body is being folded and the display circuit on the side face displays information, the single control circuit halts display on the inside face by the display circuit temporarily, stores the information on the inside face in a memory, powers off the display on the inside face and powers on the display on the outside face.

56. A collapsible mobile terminal according to claim 50, wherein:
the single control circuit powers off the display circuit on the inside face when the body is in a closed state.

57. A collapsible mobile terminal according to claim 50, wherein:
the single control circuit powers off the display circuit on the outside face when the body is in an opened state.

58. A collapsible mobile terminal according to claim 38, wherein:
when it is detected by the opening/closing detection circuit that the body is being folded the information and the display circuit on the side face displays information, the single control circuit halts display on the inside face by the display circuit temporarily, stores the information displayed on the inside face in a memory, powers off the display on the inside face and powers on the display on the outside face.

59. A collapsible mobile terminal according to claim 58, wherein:
the single control circuit powers off the display circuit on the inside face when the body is in a closed state.

60. A collapsible mobile terminal according to claim 58, wherein:

the single control circuit powers off the display circuit on the outside face when the body is in an opened state.

61. A collapsible mobile terminal according to claim 38, wherein:
the single control circuit powers off the display circuit on the inside face when the body is in a closed state.

62. A collapsible mobile terminal according to claim 61, wherein:
the single control circuit powers off the display circuit on the outside face when the body is in an opened state.

63. A collapsible mobile terminal according to claim 38, wherein:
the single control circuit powers off the display circuit on the outside face when the body is in an opened state.

64. A display method of a collapsible mobile terminal in which a common display bus connects a display on the outside face of a folded body and a display on the inside face of the body to a single controller, the display method comprising:
an opening/closing detection process for detecting an opened or closed state of the body; and
a display control process for controlling the display on the outside face and the display on the inside face based upon the result of detection in the opening/closing detection process, wherein:
data is transmitted between the displays and the single controller on the common bus;
in the display control process, when the state of the body detected in the opening/closing detection process is a closed state, the display on the inside face is powered off; and
in the display control process, when the state of the body detected in the opening/closing detection process is an opened state, the display on the outside face is powered off,
the single controller controlling at least one function of said collapsible mobile terminal and at least one application resident on said collapsible mobile terminal,
execution of the at least one application being interrupted by activation of the at least one function at least after the opening/closing detection process detects the opened or closed state of the body.

65. A display method of a collapsible mobile terminal according to claim 64, wherein:
an input circuit to which the display on the outside face and the display on the inside face are connected in common is at high impedance even if the input circuit is powered off.

66. A display method of a collapsible mobile terminal according to claim 65, wherein:
when it is detected in the opening/closing detection process that the body is being unfolded and the display on the outside face displays information, in the display control process, the display on the outside face is temporarily halted and the displayed information is stored in a memory, the display on the outside face is powered off and the display on the inside face is powered on.

67. A display method of a collapsible mobile terminal according to claim 65, wherein:
when it is detected in the opening/closing detection process that the body is being folded and the display on the inside face displays information, display on the inside face is temporarily halted and the displayed information is stored in a memory, the display on the inside face is powered off and the display on the outside face is powered on.

68. A display method of a collapsible mobile terminal according to claim 64, wherein:
when it is detected in the opening/closing detection process that the body is unfolded and the display on the outside face displays information, in the display control process, display on the display on the outside face is temporarily halted and the display is stored in a memory, the display on the outside face is powered off and the display on the inside face is powered on.

69. A display method of a collapsible mobile terminal according to claim 68, wherein:
in case the body is unfolded and then folded, in the display control process, processing before unfolding is resumed using the information on the display on the outside face and data related to it respectively stored in the memory.

70. A display method of a collapsible mobile terminal according to claim 69, wherein:
when it is detected in the opening/closing detection process that the body is being folded and the display on the inside face displays information, display on the inside face is temporarily halted and the displayed information is stored in a memory, the display on the inside face is powered off and the display on the outside face is powered on.

71. A display method of a collapsible mobile terminal according to claim 68, wherein:
when it is detected in the opening/closing detection process that the body is being folded and the display on the inside face displays information, display on the inside face is temporarily halted and the displayed information is stored in a memory, the display on the inside face is powered off and the display on the outside face is powered on.

72. A display method of a collapsible mobile terminal according to claim 64, wherein:
when it is detected in the opening/closing detection process that the body is being folded and the display on the inside face displays information, the display on the inside face is temporarily halted and the display is stored in a memory, the display on the inside face is powered off and the display on the outside face is powered on.

73. A display control program of a collapsible mobile terminal in which a common display bus connects a display on the outside face of the collapsible body and a display on the inside face of the body to a single controller wherein:
an opening/closing detection process for detecting an opened or closed state of the body, a display control process for controlling the display on the outside face and the display on the inside face based upon the result of detection in the opening/closing detection process and a process for transmission of information between the display and the single controller are executed by a computer;
in the display control process, when the state of the body detected in the opening/closing detection process is a closed state, the display on the inside face is powered off; and
in the display control process, when the state of the body detected in the opening/closing detection process is an opened state, the display on the outside face is powered off,
the single controller controlling at least one function of said collapsible mobile terminal and at least one application resident on said collapsible mobile terminal, execution of the at least one application being interrupted by activation of the at least one function at least after the opening/closing detection process detects the opened or closed state of the body.

74. A display control program of a collapsible mobile terminal according to claim 73, wherein:
an input process controls an input circuit which the display on the outside face and the display on the inside face are connected in common to be at high impedance even if the input circuit is powered off.

75. A display control program of a collapsible mobile terminal according to claim 74, wherein:
when it is detected in the opening/closing detection process that the body is being unfolded and the display on the outside face displays information, the display control process halts the display on the outside face temporarily, stores the displayed information in a memory, powers the display on the outside face off and powers the display on the inside face on.

76. A display control program of a collapsible mobile terminal according to claim 74, wherein:
when it is detected in the opening/closing detection process that the body is being folded and the display on the inside face displays information, the display on the inside face is temporarily halted and the displayed information is stored in a memory, the display on the inside face is powered off and the display on the outside face is powered on.

77. A display control program of a collapsible mobile terminal according to claim 73, wherein:
when it is detected in the opening/closing detection process that the body is being unfolded and the display on the outside face displays information, the display control process halts the display of the information on the display on the outside face temporarily, stores the displayed information in a memory, powers the display on the outside face off and powers the display on the inside face on.

78. A display control program of a collapsible mobile terminal according to claim 77, wherein:
when it is detected in the opening/closing detection process that the body is being folded and the display on the inside face displays information, the display on the inside face is temporarily halted and the displayed information is stored in a memory, the display on the inside face is powered off and the display on the outside face is powered on.

79. A display control program of a collapsible mobile terminal according to claim 73, wherein:
when it is detected in the opening/closing detection process that the body is being folded and the display on the inside face displays information, display of the information on the display on the inside face is temporarily halted and the displayed information is stored in a memory, the display on the inside face is powered off and the display on the outside face is powered on.

80. A display control program method of a collapsible mobile terminal according to claim 79, wherein:
in case the body is unfolded and a conversation is made, processing before the conversation is resumed using the stored information on the display circuit on the outside face and data related to it respectively stored in the memory.

81. A collapsible mobile terminal, comprising:
a collapsible body;
a first display circuit on the outside face of the body;
a second display circuit on the inside face of the body;
a detection circuit configured to detect whether a state of the body is a folded state or an unfolded state; and
a single control circuit at least configured to halt a display on the first display circuit temporarily and to store data relating to the display on the first display circuit in a memory when the detection circuit detects a change in the state of the body from the folded state to the unfolded state,
the single control circuit controlling at least one function of said collapsible mobile terminal and at least one application resident on said collapsible mobile terminal,
execution of the at least one application being interrupted by activation of the at least one function at least after the detection circuit detects the folded state or the unfolded state of the body.

82. A collapsible mobile terminal according to claim 81, wherein the single control circuit resumes the halted display on the first display circuit using the data stored in the memory when the detection circuit detects a change in the state of the body from the unfolded state to the folded state after the halt of the display on the first display circuit.

83. A collapsible mobile terminal according to claim 82, further comprising
a common display bus configured to connect the control circuit and both the first display circuit and the second display circuit.

* * * * *